US007615085B2

(12) United States Patent
Schwab et al.

(10) Patent No.: US 7,615,085 B2
(45) Date of Patent: Nov. 10, 2009

(54) COMPOSITION AND METHOD TO REDUCE PEROXIDES IN MIDDLE DISTILLATE FUELS CONTAINING OXYGENATES

(75) Inventors: Scott D. Schwab, Richmond, VA (US); Joshua J. Bennett, Richmond, VA (US); Allen A. Aradi, Richmond, VA (US)

(73) Assignee: Afton Chemical Corporation, Richmond, VA (US)

( * ) Notice: Subject to any disclaimer, the term of this patent is extended or adjusted under 35 U.S.C. 154(b) by 455 days.

(21) Appl. No.: 10/701,084

(22) Filed: Nov. 4, 2003

(65) Prior Publication Data

US 2005/0091912 A1 May 5, 2005

(51) Int. Cl.
*C10L 1/18* (2006.01)
*C10L 1/22* (2006.01)

(52) U.S. Cl. .............................. 44/387; 44/323; 44/324; 44/385; 44/388; 44/412; 44/444; 44/447; 44/450; 44/451

(58) Field of Classification Search .................. 44/324, 44/447, 448, 323, 385, 387, 388, 412, 444, 44/450, 451
See application file for complete search history.

(56) References Cited

U.S. PATENT DOCUMENTS

| 4,122,033 | A |   | 10/1978 | Black |         |
|-----------|---|---|---------|-------|---------|
| 5,405,417 | A | * | 4/1995  | Cunningham | 44/322 |
| 5,411,711 | A |   | 5/1995  | Swars |         |
| 5,482,518 | A |   | 1/1996  | Poirier |       |
| 5,669,938 | A | * | 9/1997  | Schwab | 44/301 |
| 5,752,989 | A |   | 5/1998  | Henly et al. |   |
| 6,080,212 | A | * | 6/2000  | Beimesch et al. | 44/388 |
| 6,447,557 | B1 | * | 9/2002 | Yeh et al. | 44/437 |
| 6,458,173 | B1 | * | 10/2002 | Lin | 44/389 |

FOREIGN PATENT DOCUMENTS

| EP | 0 428 393 B1 | 5/1991 |
| EP | 0 457 589 A | 11/1991 |
| EP | 0 1 191 090 A2 | 3/1992 |
| EP | 0 541 585 B1 | 5/1993 |
| EP | 0 755 996 A | 1/1997 |
| EP | 0 947 577 A | 10/1999 |
| EP | 0947577 | 10/1999 |
| EP | 0 1 233 051 A1 | 8/2002 |
| EP | 1 321 504 A | 6/2003 |
| EP | 1321504 | 6/2003 |
| EP | 1 516 909 A | 3/2005 |
| WO | WO 00/31216 | 6/2000 |
| WO | WO 00/31216 A | 6/2000 |

OTHER PUBLICATIONS http://www.antiquemodeler.org/diesels.htm; Ian McQueen ,1948.*
Owen et al. "Automotive Fuels Reference Book," 2nd edition. Society of Automotive Engineers, pp. 520-523 (1995).
Vardi et al., "Peroxide Formation in Low Sulfur Automotive Diesel Fuels," SAE Paper 920826.
Bacha et al., "Diesel Fuel Thermal Stability at 300 F," 6th International Conference on Stability and Handling of Liquid Fuels, Vancouver, Canada; Oct. 13-17, 1997.
Fodor et al., "Peroxide Formation in Jet Fuels," Energy and Fuels, 1988 pp. 729-734.
Bennett et al. "Hydroperoxide Formation in Ultra-Low Sulfur Diesel Fuels," International Conference on Stability and Handling of Liquid Fuels,Steamboat Springs, CO Sep. 19, 2003.
Carey et al., Advanced Organic Chemistry, 3rd ed., Plenum Press, New York, pp. 694-695.
Linstromberg et al., Organic Chemistry, A Brief Course, 6th ed., D.C. Heath & Co., Lexington, 1987, pp. 222-227.

* cited by examiner

*Primary Examiner*—Cephia D Toomer
(74) *Attorney, Agent, or Firm*—MH2 Technology Law Group LLP

(57) ABSTRACT

A reduction in the formation or presence of peroxides in middle distillate fuels is obtained through the combination of a hydrocarbon additive with the fuel. Specifically, the middle distillate fuel is blended with one or more oxygenates. The hydrocarbon additive includes a polar function group and a tertiary hydrogen beta to the functional group. Middle distillate fuels incorporating the additive, the additive itself, and methods using the additive all retard the formation of or reduce the presence of peroxides in the fuel. The reduction of peroxides improves the durability of fuels systems elastomers, enhances fuel stability and color durability, and reduces the formation of fuel sediment.

2 Claims, No Drawings

COMPOSITION AND METHOD TO REDUCE PEROXIDES IN MIDDLE DISTILLATE FUELS CONTAINING OXYGENATES

The present invention relates to a composition and method including the combination of a hydrocarbon additive with a middle distillate fuel to reduce the formation or presence in the fuel of peroxides. Specifically, the middle distillate fuel is blended with one or more oxygenates. The hydrocarbon additive includes a polar functional group and a tertiary hydrogen beta to the functional group. The combination of the additive with the middle distillate fuel retards the formation and/or reduces the presence of peroxides, and thereby improves the durability of the fuel system elastomers such as gaskets, hoses, and seals that are exposed to the peroxides in the fuel. Other benefits of the hydrocarbon additive include enhanced fuel stability and color durability, as well as a reduction in fuel sediment.

BACKGROUND

A recognized advantage of the diesel engine over spark-ignited gasoline engines is its high efficiency. The relative efficiency of the diesel engine over the spark-ignited gasoline engine is significant and translates directly to fuel economy and a lowering in greenhouse gas combustion byproducts such as carbon dioxide. On the negative side, however, the diesel engine suffers from the disadvantages of high particulate matter and $NO_x$ emissions. Particulate matter can be significantly lowered by blending oxygenates into the diesel fuel. These blends achieve significant reductions in particulate matter levels while not significantly increasing $NO_x$. Unfortunately, common oxygenates that may be blended with a diesel fuel can exacerbate the formation of peroxide in the diesel fuel. Degradation of middle distillate fuel systems as a result of peroxides may be a serious problem at ambient storage and handling conditions.

There is also a current trend towards the use of ultra low sulfur diesel fuels, commonly referred to as fuels having 50 ppm sulfur or less ("ULSD fuels"). This trend toward the use of ULSD fuels has caused substantial combustion system changes and equally significant changes in fuel specifications. Many industrialized nations are reducing and/or have already reduced their mandatory maximum specifications for sulfur content. As a result, there are new concerns with respect to the performance and handling of the fuels formulated to meet the new specifications.

One concern with ULSD fuels is that the removal of sulfur compounds, some of which are effective peroxide scavengers and/or decomposers, may allow peroxides to build up in these fuels. The potential increase in peroxides is detrimental to fuel systems, because peroxides are known to degrade fuel system elastomers. The increase in peroxides, therefore, could cause the possible failure of seals, gaskets and hoses in a fuel system that uses ULSD fuels. See, for instance, Owen and Coley, *Automotive Fuels Reference Book, Second Edition*, 1995, pp. 520-523. The potential seriousness of this problem is also well documented in the problems with jet fuels in the 1960's and 1970's where high peroxide content in those fuels was associated with a high failure rate for fuel hoses, gaskets and seals in those systems. E.g., Fodor, et al., "Peroxide Formation in Jet Fuels," *Energy and Fuels*, 1988, pp. 729-34.

Other concerns that arise when peroxide levels increase include fuel stability, color durability, and fuel sediments. These concerns are discussed generally in Bacha and Lesnini, "Diesel Fuel Thermal Stability at 300° F.," Sixth International Conference on Stability and Handling of Liquid Fuels, Vancouver, Canada, Oct. 13-17, 1997; Vardi and Kraus, "Peroxide Formation in Low Sulfur Automotive Diesel Fuels," SAE Paper No. 920826.

DETAILED DESCRIPTION

A reduction in the formation or presence of peroxides in middle distillate fuels is obtained through the combination of a hydrocarbon additive with the fuel. Specifically, the middle distillate fuel is blended with one or more oxygenates. The hydrocarbon additive includes a polar function group and a tertiary hydrogen beta to the functional group. Middle distillate fuels incorporating the additive, the additive itself, and methods using the additive all retard the formation of or reduce the presence of peroxides in the fuel. The reduction of peroxides improves the durability of fuels systems elastomers, enhances fuel stability and color durability, and reduces the formation of fuel sediment.

A fuel composition in accordance with embodiments herein comprises a middle distillate fuel, an oxygenate, and a hydrocarbon additive, wherein the hydrocarbon additive comprises a polar functional group and a tertiary hydrogen beta to the functional group. A method of reducing the amount of peroxides in middle distillate fuels blended with one or more oxygenates comprises the steps of providing a middle distillate fuel blended with one or more oxygenates; combining the fuel with a hydrocarbon additive, the hydrocarbon additive comprising a polar functional group and a tertiary hydrogen beta to the functional group; wherein the amount of hydrocarbon additive combined with the fuel reduces the amount of peroxides in the fuel as compared with the same fuel without the hydrocarbon additive.

It is believed that hydrocarbon additives with polar functional groups and a tertiary hydrogen (protic hydrogen) beta to the functional group act as middle distillate fuel radical sinks at storage and handling temperatures. These radical sinks trap the hot radicals $R^*$, $OH^*$, and $R_1$—$CH^*$—$O$—$R_2$ in oxygenated middle distillate fuels and shut off the peroxide generation. Untreated oxygenated fuels may generate peroxides as follows:

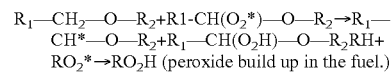

$RO_2^* \rightarrow RO_2H$ (peroxide build up in the fuel.)

The polar functional groups on the additive molecules may be the characteristic moieties of the following: alcohols, alkyl esters, carboxylic acids, ketones, aldehydes, amines, amine esters, nitro-, and nitrite-compounds, nitrate esters, phenols, and other functional groups that are either electron withdrawing in the beta-position of the hydrocarbon molecule to which they are appended, or are capable of radical resonance delocalization.

The hydrocarbon additive includes the class of compounds that are chemically set to act as radical sinks for the nascent alkyl ($R^*$) and hydroxyl ($OH^*$) radicals before these radicals can accelerate the chain branching and propagating steps of fuel radical building to peroxide formation. The radical quenching reactions are represented by the two equations below,

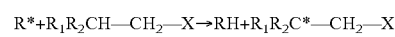

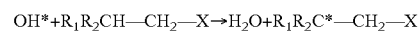

where $R_1$ and $R_2$ are different alkyl groups of carbon chain lengths of between $C_2$-$C_{30}$ appended to the radical scavenging molecule at the beta-position to the polar "X" functional group composed of any functional groups that are electron withdrawing in the beta-position of the radical scavenging additive molecule.

In one example, an alkyl nitrate serves as a radical sink to inhibit peroxide formation in low sulfur diesel fuel.

$$R^* + R_1R_2CH\text{---}CH_2\text{---}ONO_2 \rightarrow RH + R_1R_2C^*\text{---}CH_2\text{---}ONO_2$$

The product $R_1R_2C^*\text{---}CH_2\text{---}ONO_2$ has the radical stabilized on a tertiary carbon beta to the nitrate functional group which can also further stabilize the radical through resonance delocalization over the nitrate functional group. Similar radical stabilizing equations may be written for additive molecules with the other functional groups listed above that can act as radical sinks.

The hydrocarbonaceous fuels utilized herein are comprised in general of mixtures of hydrocarbons which fall within the distillation range of about 160° to about 370° C. Such fuels are frequently referred to as "middle distillate fuels" since they comprise the fractions which distill after gasoline. Such fuels include diesel fuels, biodiesel and biodiesel-derived fuels, burner fuel, kerosenes, gas oils, jet fuels, and gas turbine engine fuels.

In an embodiment, applicable middle distillate fuels are those characterized by having the following distillation profile:

|     | ° F.    | ° C.    |
|-----|---------|---------|
| IBP | 250-500 | 121-260 |
| 10% | 310-550 | 154-288 |
| 50% | 350-600 | 177-316 |
| 90% | 400-700 | 204-371 |
| EP  | 450-750 | 232-399 |

Diesel fuels having a clear cetane number (i.e., a cetane number when devoid of any cetane improver such as an organic nitrate) in the range of 30 to 60 may also be used. In another example are those in which the clear cetane number is in the range of 40 to 50.

Particulate matter emissions from diesel fuel combustion systems can significantly be lowered by blending oxygenates into the diesel fuel at levels of between 2-6% (8-15 vol %) fuel oxygen content. These blends achieve between 30-50% reductions in particulate matter levels while not significantly increasing $NO_x$. The oxygenates that may be used include; ethers such as dimethyl ether (DME), butyl ether, amyl ether, di-n-butyl ether; glyme polyethers such as, diethylene glycol methyl ether (DGME), triethylene glycol dimethyl ether (triglyme), diethylene glycol dimethyl ether (diglyme), 1,2-dimethoxyethane (glyme), Cetaner (a blend of 96% glyme and 4% dimethoxymethane), ethylene glycol mono-tert-butyl ether, ethylene glycol mono-n-butyl ether; carbonates such as dimethyl carbonate and diethyl carbonate; di-acetates such as ethylene glycol acetate; acetals such as dimethoxymethane (DMM or methyl-al), 2-ethylhexylacetate; esters of plant and animal oils such as methyl soyate, alcohols, such as ethanol, methanol, isopropanol, butanol, ketones, aldehydes, carboxylic acids and esters thereof, etc.

Ethers such as those listed above that can be blended into diesel fuel to lower particulate emissions in diesel engines are prone to autooxidation in the presence of oxygen to form peroxides, as shown in equation 1.

$$R_1\text{---}CH_2\text{---}O\text{---}R_2 + O_2 \rightarrow R_1\text{---}CH^*\text{---}O\text{---}R_2 + O_2H^* \quad [1]$$

$$R_1\text{---}CH^*\text{---}O\text{---}R_2 + O_2 \rightarrow R_1\text{---}CH(O_2^*)\text{---}O\text{---}R_2 \quad [2]$$

$$R_1\text{---}CH_2\text{---}O\text{---}R_2 + O_2H^* \rightarrow R_1\text{---}CH^*\text{---}O\text{---}R_2 + H_2O_2 \quad [3]$$

$$H_2O_2 \rightarrow 2OH^* \quad [4]$$

$$R_1\text{---}CH(O_2H)\text{---}O\text{---}R_2 \rightarrow R_1\text{---}CH^*\text{---}O\text{---}R_2 + OH^* \quad [5]$$

$$R_1\text{---}CH_2\text{---}O\text{---}R_2 + R1\text{-}CH(O_2^*)\text{---}O\text{---}R_2 \rightarrow R_1\text{---}CH^*\text{---}O\text{---}R_2 + R_1\text{---}CH(O_2H)\text{---}O\text{---}R_2 \quad [6]$$

Pure diesel fuel is also prone to autooxidation and oxidatively degrades at storage temperatures due to peroxide formation by fuel reaction with oxygen. This peroxide formation is temperature dependent, forming at higher rates with increasing temperature. Peroxide-laden fuels pose an explosion hazard on storage and handling. This hazard is further exacerbated when the diesel fuel is blended with oxygenates which form peroxides at an even higher rate, as described by equations 1-6. Degradation due to peroxide formation may become a serious problem at ambient storage and handling conditions (up to 80° C.).

Peroxide formation in hydrocarbons such as middle distillate fuels (diesel, jet fuel, etc) is initiated by oxygen abstraction of a hydrogen radical from a fuel molecule according to the reactions, $$RH + O_2 \rightarrow R^* + HO_2^* \quad [7]$$

$$RH + HO_2^* \rightarrow R^* + H_2O_2 \quad [8]$$

$$H_2O_2 \rightarrow 2OH^* \quad [9]$$

$$R^* + O_2 \rightarrow RO_2^* \quad [10]$$

$$RH + RO_2^* \rightarrow RO_2H \text{ (peroxide build up in the fuel)} \quad [11]$$

Reactions 7-9 initiate and accelerate fuel peroxide formation through the two "hot" radicals $R^*$ (alkyl radical) and $OH^*$ (hydroxyl radical). Reactions 10 and 11 show how the alkyl radical $R^*$ leads to a peroxide build up in the fuel. This peroxide poses a thermal explosive hazard during storage under elevating temperatures. Therefore, neutralization of the two 'hot' radicals $R^*$ and $OH^*$ through use of the hydrocarbon additive described earlier herein would effectively shut down fuel peroxide radical formation at ambient temperatures.

Other additives may be included within the fuel compositions described herein provided they do not adversely affect the amount or formation of peroxides otherwise obtained herein. Thus, use may be made of one or more of such components as corrosion inhibitors, antioxidants, anti-rust agents, detergents and dispersants, fuel lubricity additives, demulsifiers, dyes, inert diluents, cold flow improvers, conductivity agents, metal deactivators, stabilizers, antifoam additives, de-icers, biocides, odorants, drag reducers, combustion improvers, e.g., including MMT (methylcyclopentadienyl manganese tricarbonyl), oxygenates and like materials. These additives may also be used in combinations as additive packages.

Sulfur compounds themselves may reduce the amount of peroxide in a fuel, so the present analysis is directed to low sulfur fuels. For example, ultra-low sulfur fuels containing the organic nitrate combustion improver may have less than about 100 ppm sulfur, or alternatively, less than about 50 ppm sulfur. Still further alternative includes fuels having less than about 20 ppm or less than about 10 ppm of sulfur.

The concentration of hydrocarbon additive in the oxygenated middle distillate fuel can be varied within relatively wide limits such that the amount employed is at least sufficient to cause a reduction in the presence and/or formation of peroxides. The treat rate may vary depending on the type and concentration of oxygenates blended with the fuel. The treat rate may also vary depending on the particular hydrocarbon additive combined with the fuel. This amount may fall within the range of 100 to 5,000 parts by volume per million parts of fuel. In one example, the hydrocarbon additive is combined with the fuel at a treat rate of 500-2500 parts by volume per million parts of fuel.

The organic hydrocarbon additive described herein with an oxygenate middle distillate fuel enables each of (1) elastomer durability benefit, (2) enhanced fuel stability, (3) fuel sediment reduction, and (4) enhanced color durability obtained by keeping the amount of peroxides in oxygenated fuels less than about 8 ppm.

Based on the foregoing analysis, it is seen that peroxide formation and/or presence (i.e., the amount of peroxide) is reduced in oxygenated middle distillate fuels containing the hydrocarbon additive. This may be a significant benefit in prolonging the life of elastomeric materials contacting the fuels when the fuels are stored for long periods of time. Other benefits include enhanced fuel stability, color durability, and a reduction in fuel sediments.

It is expected that the durability of elastomers susceptible to degradation by exposure to peroxides in a fuel system might thus be extended or enhanced by at least 25% in terms of miles driven, gallons of fuel combusted or days/years of service as compared to the durability of elastomers in a fuel system not containing a hydrocarbon additive as described. In another embodiment, the elastomer durability is extended or enhanced by at least 10% as compared to the durability of elastomers exposed to fuels not containing a hydrocarbon additive.

It is expected that the fuel stability of a middle distillate fuel might thus be extended or enhanced by at least 25% in terms of miles driven, gallons of fuel combusted or days/years of service as compared to the fuel stability of a fuel not containing a hydrocarbon additive as described. In another embodiment, the fuel stability is extended or enhanced by at least 10% as compared to the stability of fuels not containing a hydrocarbon additive.

It is expected that the durability of fuel color might thus be extended or enhanced by at least 25% in terms of miles driven, gallons of fuel combusted or days/years of service as compared to the durability of fuel color in a fuel not containing hydrocarbon additive as described. In another embodiment, the fuel color durability is expected to be extended or enhanced by at least 10% as compared to the durability of fuels not containing a hydrocarbon additive.

It is expected that the formation or presence of fuel sediments is reduced by at least 25% in terms of miles driven, gallons of fuel combusted or days/years of service as compared to the amount of fuel sediments in a fuel not containing a hydrocarbon additive as described. In another embodiment, the amount of fuel sediments is reduced or enhanced by 10% as compared to the amount of fuel sediments in fuels not containing a hydrocarbon additive.

It is to be understood that the reactants and components referred to by chemical name anywhere in the specification or claims hereof, whether referred to in the singular or plural, are identified as they exist prior to coming into contact with another substance referred to by chemical name or chemical type (e.g., base fuel, solvent, etc.). It matters not what chemical changes, transformations and/or reactions, if any, take place in the resulting mixture or solution or reaction medium as such changes, transformations and/or reactions are the natural result of bringing the specified reactants and/or components together under the conditions called for pursuant to this disclosure. Thus the reactants and components are identified as ingredients to be brought together either in performing a desired chemical reaction or in forming a desired composition (such as an additive concentrate or additized fuel blend). It will also be recognized that the additive components can be added or blended into or with the base fuels individually per se and/or as components used in forming preformed additive combinations and/or sub-combinations. Accordingly, even though the claims hereinafter may refer to substances, components and/or ingredients in the present tense ("comprises", "is", etc.), the reference is to the substance, components or ingredient as it existed at the time just before it was first blended or mixed with one or more other substances, components and/or ingredients in accordance with the present disclosure. The fact that the substance, components or ingredient may have lost its original identity through a chemical reaction or transformation during the course of such blending or mixing operations or immediately thereafter is thus wholly immaterial for an accurate understanding and appreciation of this disclosure and the claims thereof.

At numerous places throughout this specification, reference has been made to a number technical papers. All such cited documents are expressly incorporated in full into this disclosure as if fully set forth herein.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

Applicant does not intend to dedicate any disclosed embodiments to the public, and to the extent any disclosed modifications or alterations may not literally fall within the scope of the claims, they are considered to be part of the invention under the doctrine of equivalents.

What is claimed is:

1. A fuel composition, comprising:
    a middle distillate fuel;
    an oxygenate selected from the group consisting of the following: carbonates, di-acetates, acetals, 2-ethylhexylacetate, and mixtures of one or more of the foregoing; and
    a hydrocarbon additive described by the formula $R_1 R_2 CH-CH_2-X$, wherein X is a polar functional group selected from the group consisting of the characteristic moieties of the following: alcohols, alkyl esters, carboxylic acids, ketones, aldehydes, amines, amine esters, nitro-, and nitrite-compounds, nitrate esters, phenols, and mixtures of one or more of the foregoing; and $R_1$ and $R_2$ are different alkyl groups of carbon chain length of from two to about thirty carbon atoms appended to the carbon molecule beta to the polar functional group, and
    wherein the fuel has a sulfur content of about 20 ppm or less, the amount of hydrocarbon additive is 500 to 2500 parts by volume per million parts of fuel, and wherein the amount of peroxides in the fuel composition is less than about 8 ppm.

2. The fuel composition as described in claim 1, wherein the oxygenate is selected from the group consisting of dimethyl carbonate, diethyl carbonate, ethylene glycol acetate, dimethoxymethane (DMM or methyl-al), 2-ethylhexylacetate, and mixtures of one or more of the foregoing.

* * * * *